United States Patent
Anderson et al.

(10) Patent No.: US 10,620,957 B2
(45) Date of Patent: Apr. 14, 2020

(54) METHOD FOR FORMING CONSTANT EXTENSIONS IN THE SAME EXECUTE PACKET IN A VLIW PROCESSOR

(71) Applicant: Texas Instruments Incorporated, Dallas, TX (US)

(72) Inventors: Timothy David Anderson, University Park, TX (US); Duc Quang Bui, Grand Prairie, TX (US); Joseph Raymond Zbiciak, Farmers Branch, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 598 days.

(21) Appl. No.: 14/920,402

(22) Filed: Oct. 22, 2015

(65) Prior Publication Data

US 2017/0115989 A1    Apr. 27, 2017

(51) Int. Cl.
| | |
|---|---|
| *G06F 9/302* | (2018.01) |
| *G06F 9/318* | (2018.01) |
| *G06F 9/30* | (2018.01) |
| *G06F 9/38* | (2018.01) |
| *G06F 7/499* | (2006.01) |
| *G06F 15/80* | (2006.01) |

(52) U.S. Cl.
CPC ........ *G06F 9/30181* (2013.01); *G06F 9/3016* (2013.01); *G06F 9/30167* (2013.01); *G06F 9/3802* (2013.01); *G06F 9/3822* (2013.01); *G06F 9/3836* (2013.01); *G06F 9/3853* (2013.01); *G06F 7/49994* (2013.01); *G06F 9/3001* (2013.01); *G06F 9/30036* (2013.01); *G06F 9/30145* (2013.01); *G06F 15/8053* (2013.01)

(58) Field of Classification Search
CPC .............. G06F 9/30181; G06F 9/3016; G06F 9/30167; G06F 9/3802; G06F 9/3013; G06F 9/30145; G06F 9/3822; G06F 9/3836; G06F 9/3853; G06F 9/3001; G06F 9/30036; G06F 15/8053; G06F 7/49994
USPC .................. 712/3–5, 24, 203, 213–215, 221
See application file for complete search history.

(56) References Cited

U.S. PATENT DOCUMENTS

| | | | |
|---|---|---|---|
| 6,292,845 B1* | 9/2001 | Fleck .................. | G06F 9/30149 710/307 |
| 6,442,701 B1* | 8/2002 | Hurd ..................... | G06F 1/3203 712/204 |

(Continued)

*Primary Examiner* — Daniel H Pan
(74) *Attorney, Agent, or Firm* — Brian D. Graham; Charles A. Brill; Frank D. Cimino

(57) ABSTRACT

In a very long instruction word (VLIW) central processing unit instructions are grouped into execute packets that execute in parallel. A constant may be specified or extended by bits in a constant extension instruction in the same execute packet. If an instruction includes an indication of constant extension, the decoder employs bits of a constant extension instruction to extend the constant of an immediate field. Two or more constant extension slots are permitted in each execute packet, each extending constants for a different predetermined subset of functional unit instructions. In an alternative embodiment, more than one functional unit may have constants extended from the same constant extension instruction employing the same extended bits. A long extended constant may be formed using the extension bits of two constant extension instructions.

28 Claims, 9 Drawing Sheets

(56) References Cited

U.S. PATENT DOCUMENTS

| | | | |
|---|---|---|---|
| 6,751,724 B1* | 6/2004 | Moyer | G06F 9/3802 |
| | | | 712/205 |
| 9,652,686 B2* | 5/2017 | Sankaranarayanan | ........................ |
| | | | G06K 9/4638 |
| 2002/0087834 A1* | 7/2002 | Faraboschi | G06F 9/3016 |
| | | | 712/215 |
| 2003/0236965 A1* | 12/2003 | Sheaffer | G06F 9/30076 |
| | | | 712/209 |
| 2005/0125637 A1* | 6/2005 | Dijkstra | G06F 9/30025 |
| | | | 712/221 |
| 2009/0182942 A1* | 7/2009 | Greiner | G06F 9/30047 |
| | | | 711/119 |
| 2011/0029759 A1* | 2/2011 | Macy, Jr. | G06F 7/76 |
| | | | 712/208 |
| 2011/0219212 A1* | 9/2011 | Codrescu | G06F 9/30149 |
| | | | 712/208 |
| 2012/0284489 A1* | 11/2012 | Plondke | G06F 9/30167 |
| | | | 712/226 |
| 2014/0006748 A1* | 1/2014 | Stewart | G06F 15/7867 |
| | | | 712/3 |

\* cited by examiner

METHOD FOR FORMING CONSTANT EXTENSIONS IN THE SAME EXECUTE PACKET IN A VLIW PROCESSOR

RELATED APPLICATIONS

This application is an improvement of U.S. patent application Ser. No. 14/326,969 filed Jul. 9, 2014 entitled "METHOD TO EXTEND THE NUMBER OF CONSTANT BITS EMBEDDED IN AN INSTRUCTION SET" which claims priority under 35 U.S.C. 119(e)(1) to U.S. Provisional Application No. 61/844,099 filed Jul. 9, 2013.

TECHNICAL FIELD OF THE INVENTION

The technical field of this invention is digital data processing and more specifically providing instructions with extended constants.

BACKGROUND OF THE INVENTION

This application is an improvement of U.S. patent application Ser. No. 14/326,969 filed Jul. 9, 2014 entitled "METHOD TO EXTEND THE NUMBER OF CONSTANT BITS EMBEDDED IN AN INSTRUCTION SET."

Constants are commonly used in calculations. Such constants must be provided by the program to the instruction making computations. Such constants may be provided by storing them in memory, loading them into a register of a central processing unit register set and performing the needed computation using the register stored constant in conjunction with register stored variables.

As an alternative for little used constants, they can be embedded in instructions. The typical manner of specifying such constants is replacing an input operand field with the constant bits. Such an input operand field typically includes a number of a register storing the corresponding input operand. An immediate instruction treats this input operand field as a constant. This is called an immediate field. This severely limits the size of such constants due to the limited number of bits available. A typical central processing unit will have 16 or 32 general purpose registers. This limits the constant that can be specified by an immediate field to 4 or 5 bits.

A technique used in the prior art to specify constants employs variable length instruction words. Using variable length instruction words, the length of an instruction can be extended to provide a needed number of bits for specifying a constant. This is sub optimal because a fixed word length instruction set architecture requires fewer hardware resources to decode.

U.S. patent application Ser. No. 14/326,969 filed Jul. 9, 2014 entitled "METHOD TO EXTEND THE NUMBER OF CONSTANT BITS EMBEDDED IN AN INSTRUCTION SET" retained a fixed length instruction set. This patent provided special instruction for constant extension bits. The instruction included constant extension bits in predetermined bit locations. If an instruction included an indication of constant extension, the decoder employed bits at a predetermined bit position in an adjacent instruction to extend the constant of an immediate field. The patent application taught concatenating bits from these two sources to produce the longer constant.

SUMMARY OF THE INVENTION

This invention is an alternative to requiring the constant extension slot to be adjacent to the instruction requiring constant extension. In a very long instruction word (VLIW) central processing unit instructions are grouped into execute packets that execute in parallel. In this invention the constant extension instruction does not need to be in an adjacent instruction slot. The constant extension instruction need only be in the same execute packet as the instruction requiring constant extension. This allows greater flexibility in arranging the instructions than provided in the U.S. patent application Ser. No. 14/326,969 filed Jul. 9, 2014 entitled "METHOD TO EXTEND THE NUMBER OF CONSTANT BITS EMBEDDED IN AN INSTRUCTION SET."

In this invention the bits of a constant are specified or extended by constant extension bits in one or more constant extension instructions in the same execute packet as the instruction.

In one embodiment only a single instruction for one of a defined set of functional units can be constant extended. In the VLIW central processor each functional unit may execute only one instruction per execute packet. Thus the decoder can determine unambiguously which instruction uses the extension bits regardless of the relative positions in an execute packet.

In an alternative embodiment two or more constant extension slots are permitted in each execute packet. Each such constant extension slot can only extend constants for a different instruction from disjoint subsets of functional unit instructions. Because there can be only one instruction directed to a particular functional unit within each execute packet and the subsets are disjoint, a decoder can determine which instruction corresponds to each such constant extension slot. Thus two or more instructions within an execute packet can employ extended constants from differing constant extension instructions.

In a further alternative embodiment, more than one functional unit may have constants extended from the same constant extension instruction. In this case the same extended bits are employed in the instruction execution of each such functional unit.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
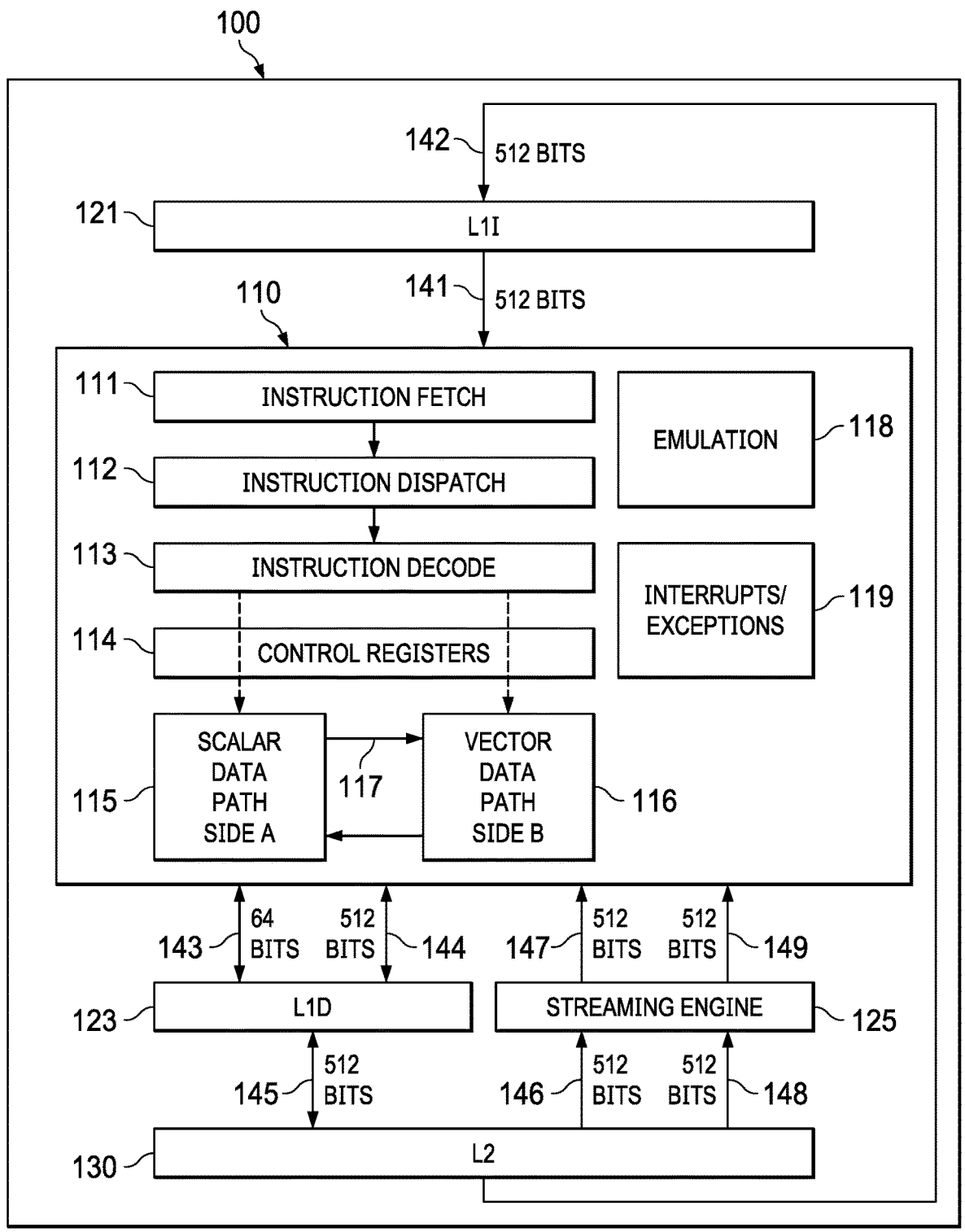
FIG. 1 illustrates a dual scalar/vector datapath processor according to one embodiment of this invention.

FIG. 1 illustrates a dual scalar/vector datapath processor according to a preferred embodiment of this invention. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In the preferred embodiment of processor 100 level two combined instruction/data cache 130 stores both instructions to back up level one instruction cache 121 and data to back up level one data cache 123. In the preferred embodiment level two combined instruction/data cache 130 is further connected to higher level cache and/or main memory in a manner not illustrated in FIG. 1. In the preferred embodiment central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In the preferred embodiment the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In the preferred embodiment of this invention, central processing unit core 110 includes plural functional units to perform instruction specified data processing tasks. Instruction dispatch unit 112 determines the target functional unit of each fetched instruction. In the preferred embodiment central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In the preferred embodiment instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116 in a manner not relevant to this invention. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 include plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enable central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined cache 130 to register files of vector datapath side B. This provides controlled data movement from memory (as cached in level two combined cache 130) directly to register files. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit 110 data reads and data writes.

Level two combined cache 130 supplies data of a first data stream to streaming engine 125 via bus 146. Bus 146 is preferably a 512-bit bus. Streaming engine 125 supplies data of this first data stream to register files of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to register files of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with the preferred embodiment of this invention.

In the preferred embodiment of this invention, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
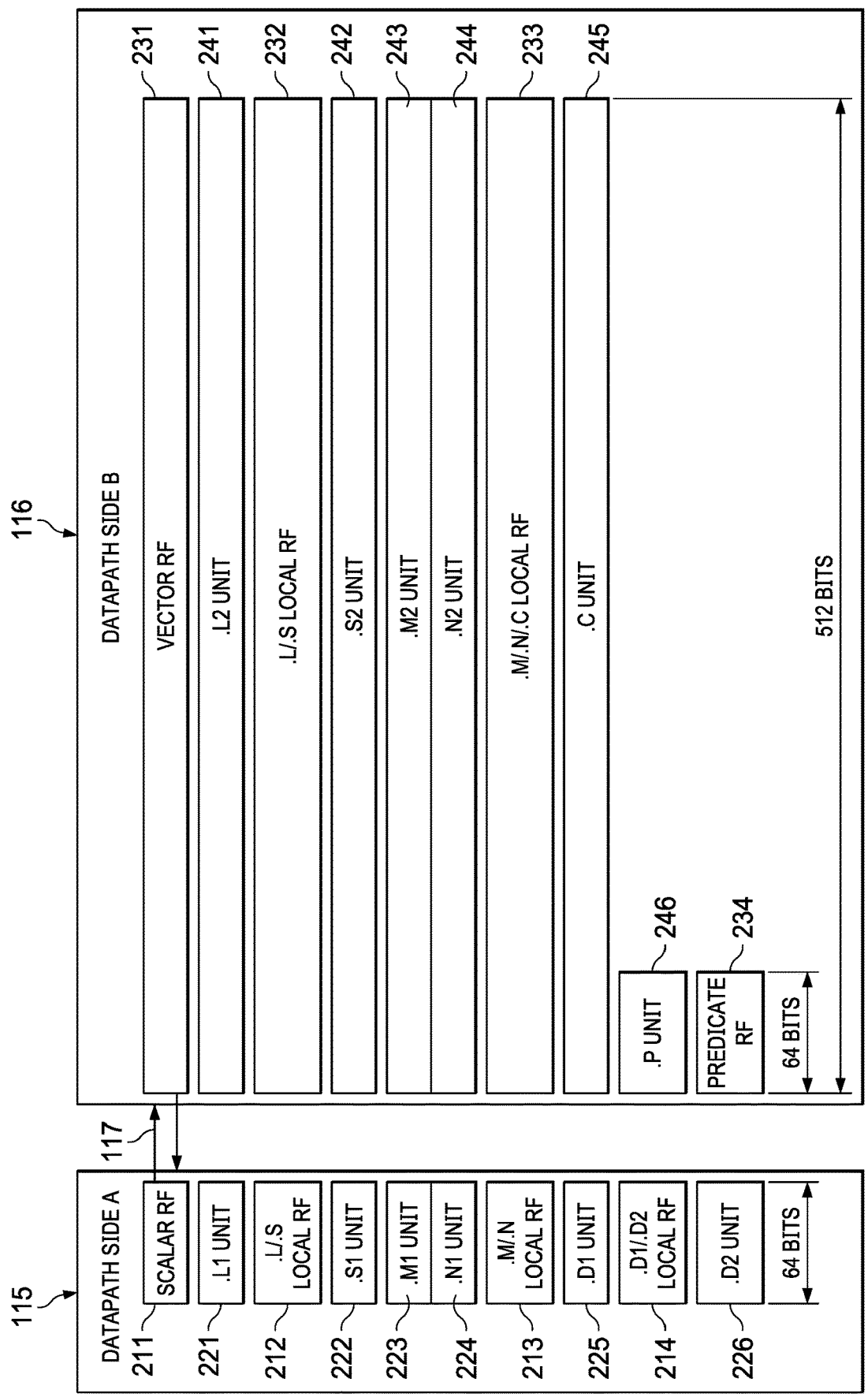
FIG. 2 illustrates the registers and functional units in the dual scalar/vector datapath processor illustrated in FIG. 1.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global scalar register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 221 generally accepts two 512 bit operands and produces one 512 bit result. The two operands are each recalled from an instruction specified register in either global vector register file 231, L2/S2 local register file 232 or predicate register file 234. L2 unit 241 preferably performs instruction similar to L1 unit 221 except on wider 512 bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512 bit operands and produces one 512 bit result. The two operands are each recalled from an instruction specified register in either global vector register file 231, L2/S2 local register file 232 or predicate register file 234. S2 unit 242 preferably performs instructions similar to S1 unit 222 except on wider 512 bit data. The result may be written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512 bit operands and produces one 512 bit result. The two operands are each recalled from an instruction specified register in either global vector register file 231 or M2/N2/C local register file 233. M2 unit 243 preferably performs instructions similar to M1 unit 223 except on wider 512 bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512 bit operands and produces one 512 bit result. The two operands are each recalled from an instruction specified register in either global vector register file 231 or M2/N2/C local register file 233. C unit 245 preferably performs: "Rake" and "Search" instructions; up to 512 2 bit PN*8 bit multiplies I/Q complex multiplies per clock cycle; 8 bit and 16 bit Sum of Absolute Difference (SAD) calculations, up to 512 SADs per clock cycle; horizontal add and horizontal min/max instructions; and vector permutes instructions. C unit 245 includes also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum of Absolute Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include AND, ANDN, OR, XOR, NOR, BITR, NEG, SET, BITCNT, RMBD, BIT Decimate and Expand. A commonly expected use of P unit 246 includes manipulation of the SIMD vector comparison results for use in control of a further SIMD vector operation.

Figure 3:
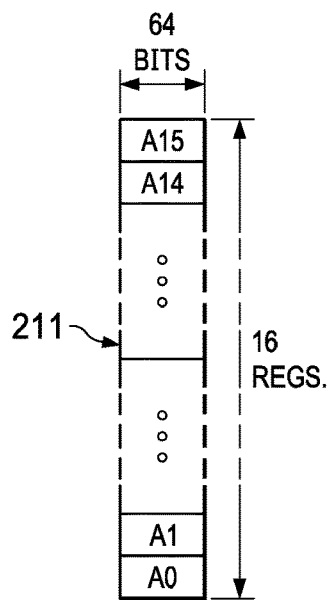
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
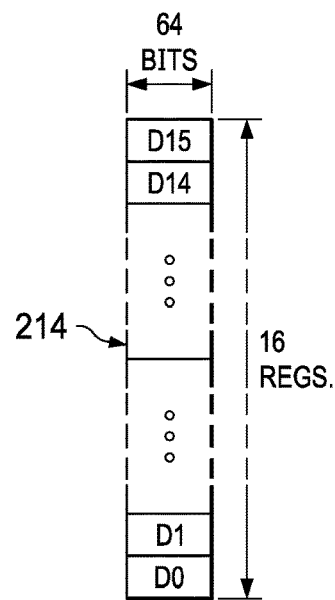
FIG. 4 illustrates a local scalar register file shared by arithmetic functional units.

FIG. 4 illustrates D1/D2 local register file 214. There are 16 independent 64 bit wide scalar registers designated D0 to D16. Each register of D1/D2 local register file 214 can be read from or written to as 64 bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
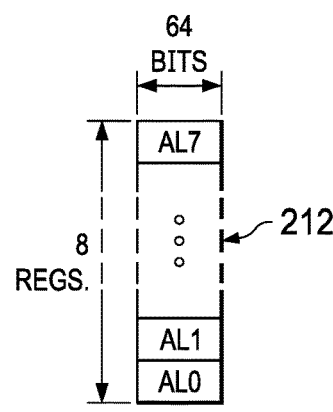
FIG. 5 illustrates a local scalar register file shared by multiply functional units.

FIG. 5 illustrates L1/S1 local register file 212. The embodiment illustrated in FIG. 5 has 8 independent 64-bit wide scalar registers designated AL0 to AL7. The preferred instruction coding (see FIG. 13) permits L1/S1 local register file 212 to include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
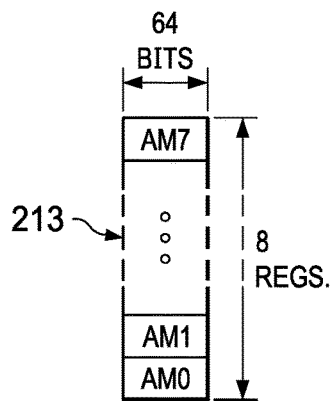
FIG. 6 illustrates a local scalar register file shared by load/store units.

FIG. 6 illustrates M1/N1 local register file 213. The embodiment illustrated in FIG. 6 has 8 independent 64-bit wide scalar registers designated AM0 to AM7. The preferred instruction coding (see FIG. 13) permits M1/N1 local register file 213 to include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
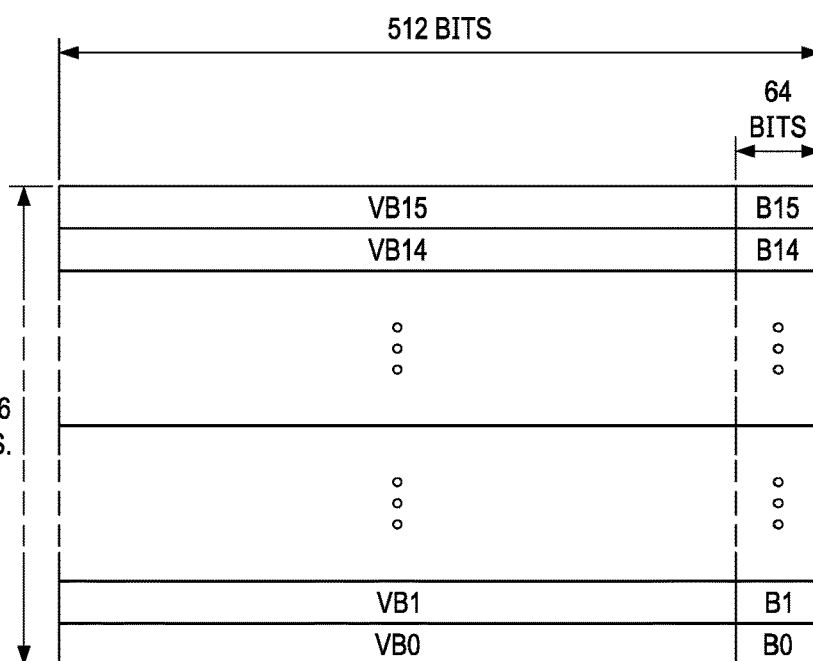
FIG. 7 illustrates a global vector register file.

FIG. 7 illustrates global vector register file 231. There are 16 independent 512 bit wide scalar registers. Each register of global vector register file 231 can be read from or written to as 64 bits of scalar data designated B0 to B15. Each register of global vector register file 231 can be read from or written to as 512 bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global vector register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
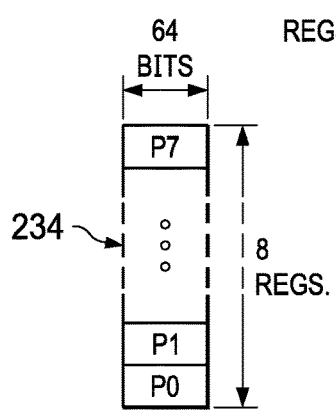
FIG. 8 illustrates a predicate register file.

FIG. 8 illustrates P local register file 234. There are 8 independent 64-bit wide registers designated P0 to P15. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

Figure 9:
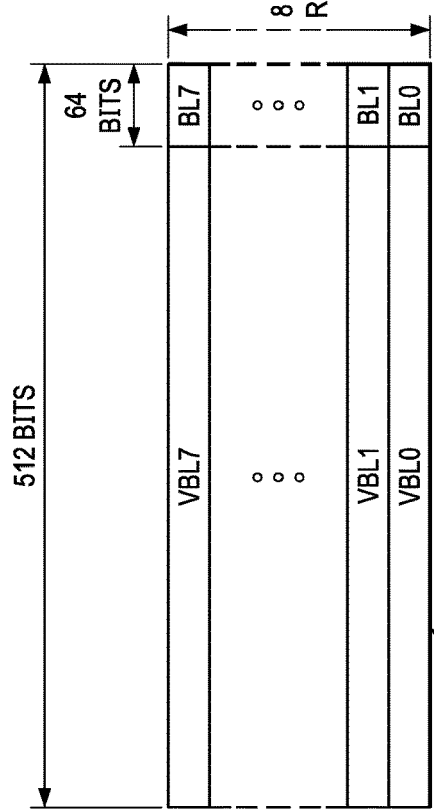
FIG. 9 illustrates a local vector register file shared by arithmetic functional units.

FIG. 9 illustrates L2/S2 local register file 232. The embodiment illustrated in FIG. 9 has 8 independent 512 bit wide scalar registers. The preferred instruction coding (see FIG. 13) permits L2/S2 local register file 232 to include up to 16 registers. The embodiment of FIG. 9 implements only 8 registers to reduce circuit size and complexity. Each register of L2/S2 local vector register file 232 can be read from or written to as 64 bits of scalar data designated BL0 to BL7. Each register of L2/S2 local vector register file 232 can be read from or written to as 512 bits of vector data designated VBL0 to VBL7. The instruction type determines the data size. All vector datapath side B 116 functional units (L2 unit 241, S2 unit 242, M2 unit 243, N2 unit 24, C unit 245 and P unit 246) can write to L2/S2 local vector register file 232. Only L2 unit 241 and S2 unit 242 can read from L2/S2 local vector register file 232.

Figure 10:
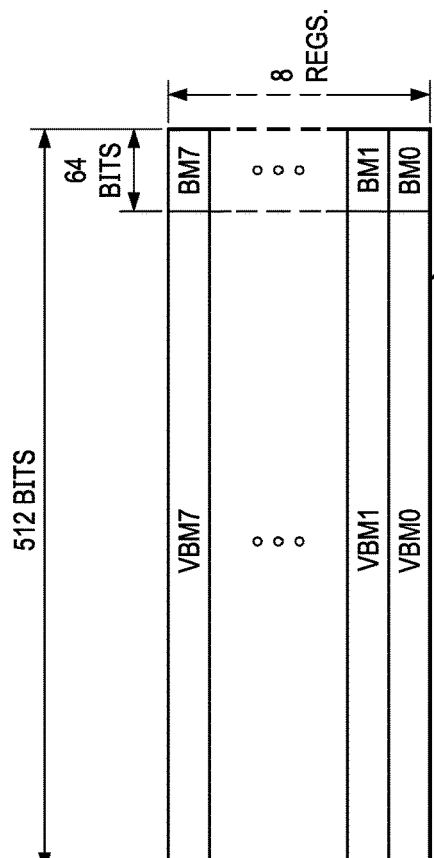
FIG. 10 illustrates a local vector register file shared by multiply and correlation functional units.

FIG. 10 illustrates M2/N2/C local register file 233. The embodiment illustrated in FIG. 10 has 8 independent 512 bit wide scalar registers. The preferred instruction coding (see FIG. 13) permits M2/N2/C local register file 233 to include up to 16 registers. The embodiment of FIG. 10 implements only 8 registers to reduce circuit size and complexity. Each register of M2/N2/C local vector register file 233 can be read from or written to as 64 bits of scalar data designated BM0 to BM7. Each register of M2/N2/C local vector register file 233 can be read from or written to as 512 bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

Crosspath 117 permits limited exchange of data between scalar datapath side A 115 and vector datapath side B 116. During each operational cycle one 64 bit data word can be recalled from global scalar register file A 211 for use as an operand by one or more functional units of vector datapath side B 116 and one 64 bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64 bit operand from global vector register file 231. This 64 bit operand is the least significant bits of the 512 bit data in the accessed register of global vector register file 231. Plural scalar datapath side A 115 functional units may employ the same 64 bit crosspath data as an operand during the same operational cycle. However, only one 64 bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64 bit operand from global scalar register file 211. If the corresponding instruction is a scalar instruction, the crosspath operand data is treated as any other 64 bit operand. If the corresponding instruction is a vector instruction, the upper 448 bits of the operand are zero filled. Plural vector datapath side B 116 functional units may employ the same 64 bit crosspath data as an operand during the same operational cycle. Only one 64 bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 11:
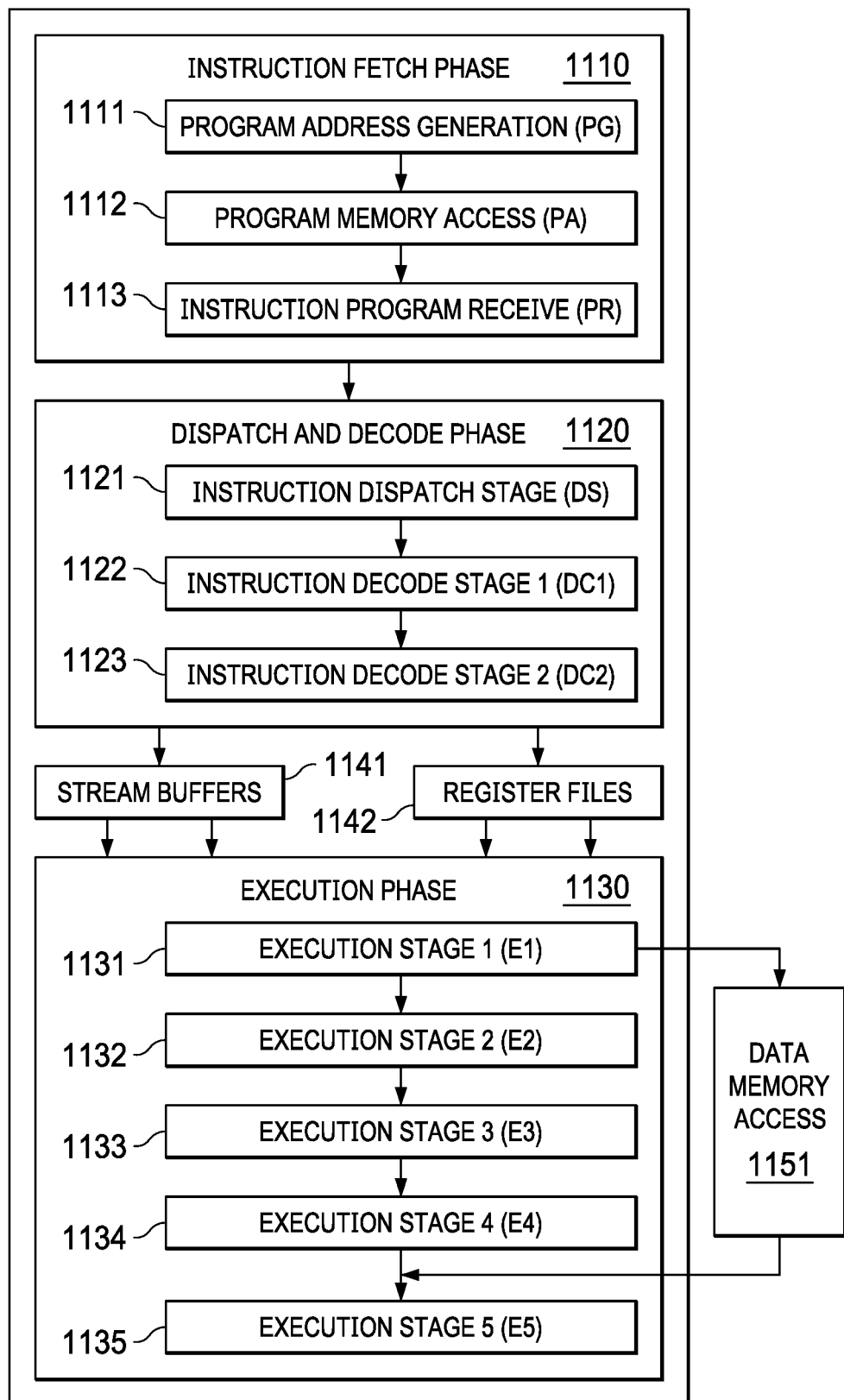
FIG. 11 illustrates pipeline phases of a central processing unit according to a preferred embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
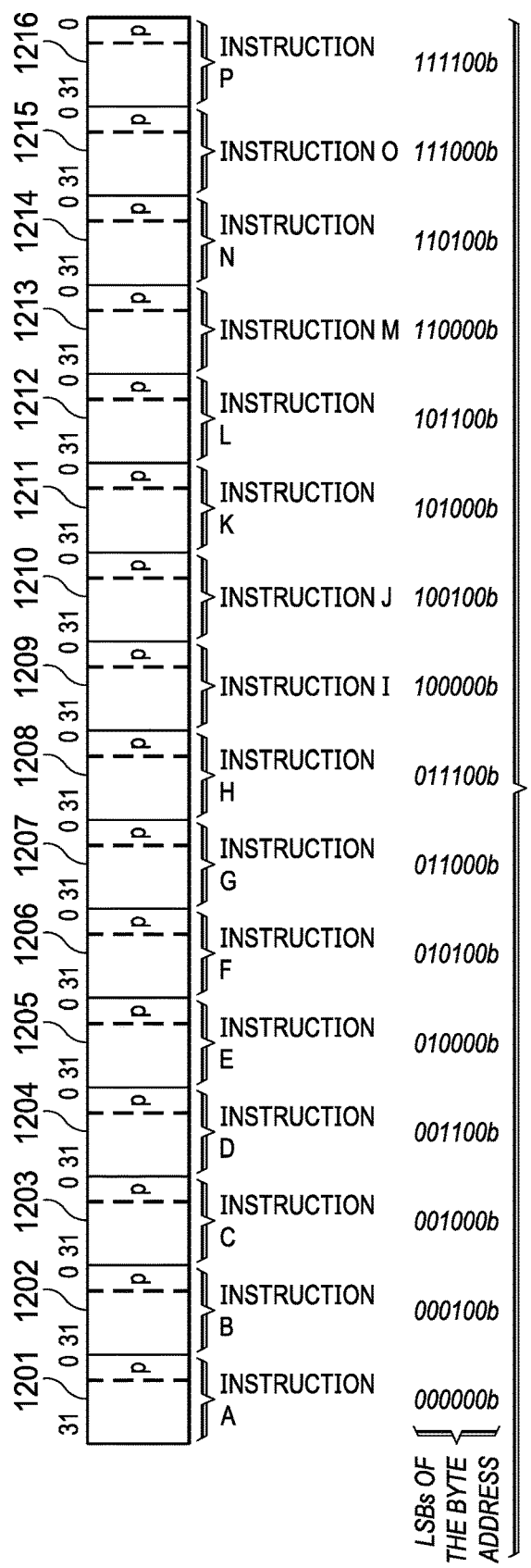
FIG. 12 illustrates sixteen instructions of a single fetch packet.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. The preferred embodiment employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by predetermined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In the preferred embodiment an execute packet can contain up to sixteen instructions. No two instructions in an execute packet may use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1110 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in a status register if saturation occurs. For 2-cycle instructions, results are written to a destination register file.

During execute 3 stage 1133 (E3) data memory accesses are performed. Any multiply instructions that saturate results set the SAT bit in the status register if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
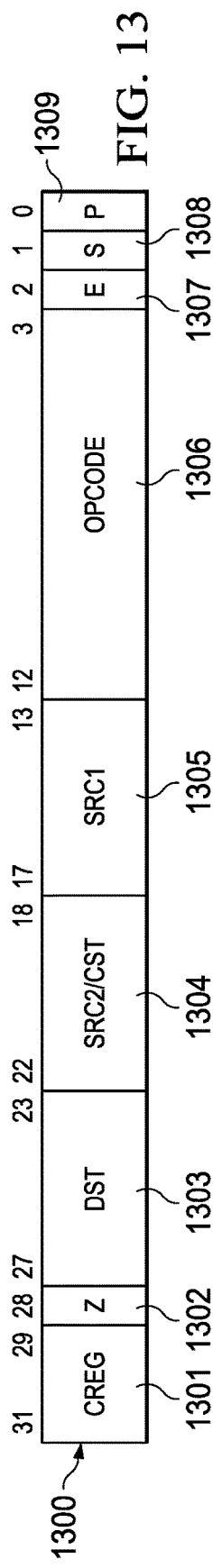
FIG. 13 illustrates an example of the instruction coding of instructions used by this invention.

FIG. 13 illustrates an example of the instruction coding 1300 of functional unit instructions used by this invention. One skilled in the art would understand how to apply the teaching of this invention to alternate instruction codings. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The creg field 1301 (bits 29 to 31) and the z bit 1302 (bit 28) are optional fields used in conditional instructions. These bits are used for conditional instructions to identify the predicate register and the condition. The z bit 1302 (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field 1301 and the z field 1302 are encoded in the instruction as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Execution of a conditional instruction is conditional upon the value stored in the specified data register. This data register is in the global scalar register file 211 for all functional units. Note that "z" in the z bit column refers to the zero/not zero comparison selection noted above and "x" is a don't care state. This coding can only specify a subset of the 16 global registers as predicate registers. This selection was made to preserve bits in the instruction coding. Note that unconditional instructions do not have these optional bits. For unconditional instructions these bits in fields 1301 and 1302 (28 to 31) are preferably used as additional opcode bits. Note further that the creg field (field 1301) and the z field (field 1302) for conditional instructions may be located at other locations such as opcode bits 2 to 12.

The dst field 1303 (bits 23 to 27) specifies a register in a corresponding register file as the destination of the instruction results.

The src2/cst field 1304 (bits 18 to 22) has several meanings depending on the instruction opcode field (bits 3 to 12 for all instructions and additionally bits 28 to 31 for unconditional instructions). The first meaning specifies a register of a corresponding register file as the second operand. The second meaning is an immediate constant. Depending on the instruction type, this is treated as an unsigned integer and zero extended to a specified data length or is treated as a signed integer and sign extended to the specified data length.

The src1 field 1305 (bits 13 to 17) specifies a register in a corresponding register file as the first source operand.

The opcode field 1306 (bits 3 to 12) for all instructions (and additionally bits 28 to 31 for unconditional instructions) specifies the type of instruction and designates appropriate instruction options. This includes unambiguous designation of the functional unit used and operation performed. A detailed explanation of the opcode is beyond the scope of this invention except for the instruction options detailed below.

The e bit 1307 (bit 2) is only used for immediate constant instructions where the constant may be extended. If e=1, then the immediate constant is extended in a manner detailed below. If e=0, then the immediate constant is not extended. In that case the immediate constant is specified by the src2/cst field 1304 (bits 18 to 22). Note that this e bit 1307 is used for only some instructions. Accordingly, with proper coding this e bit 1307 may be omitted from instructions which do not need it and this bit used as an additional opcode bit.

The s bit 1308 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1309 (bit 0) marks the execute packets. The p bit determines whether the instruction executes in parallel with the following instruction. The p bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

Figure 14:
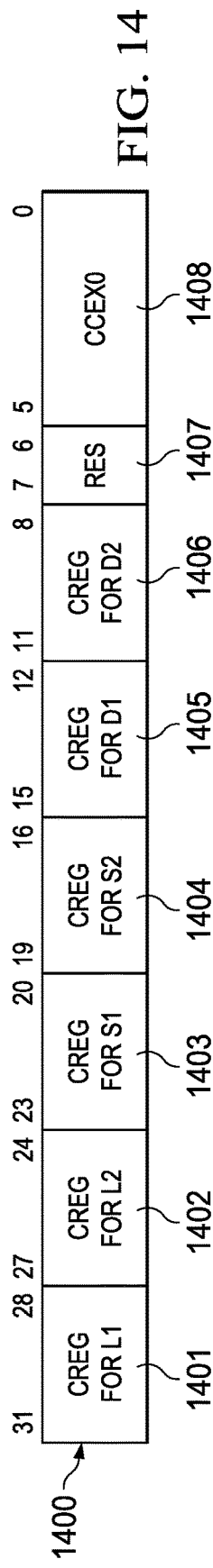
FIG. 14 illustrates the bit coding of a condition code extension slot 0.

There are two different condition code extension slots. Each execute packet can contain one each of these unique 32-bit condition code extension slots which contains the 4-bit creg/z fields for the instructions in the same execute packet. FIG. 14 illustrates the coding for condition code extension slot 0 and FIG. 15 illustrates the coding for condition code extension slot 1.

FIG. 14 illustrates the coding for condition code extension slot 0 having 32 bits. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 245 instruction in the same execute packet. Field 1407 (bits 6 and 7) is unused/reserved. Field 1408 (bits 0 to 5) are coded a set of unique bits (CCEX0) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 224 and D2 unit 225 instruction in the same execution packet. These creg/z bits are interpreted as shown in Table 1. If the corresponding instruction is conditional (includes creg/z bits) the corresponding bits in the condition code extension slot 0 override the condition code bits in the instruction. Note that no execution packet can have more than one instruction directed to a particular execution unit. No execute packet of instructions can contain more than one condition code extension slot 0. Thus the mapping of creg/z bits to functional unit instruction is unambiguous. Setting the creg/z bits equal to "0000" makes the instruction unconditional. Thus a properly coded condition code extension slot 0 can make some corresponding instructions conditional and some unconditional.

Figure 15:
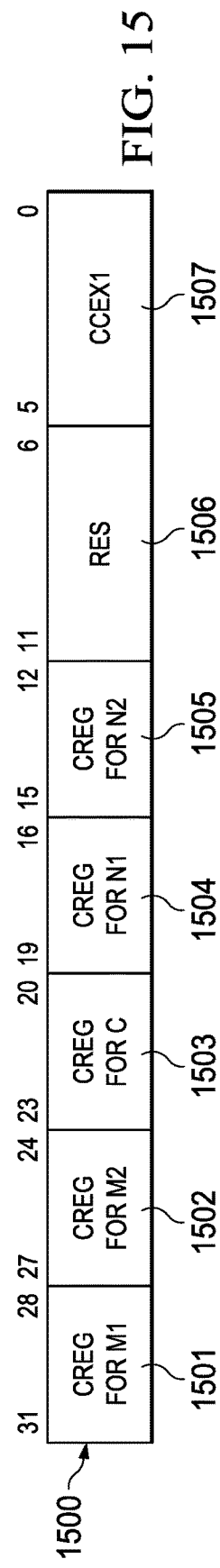
FIG. 15 illustrates the bit coding of a condition code extension slot 1.

FIG. 15 illustrates the coding for condition code extension slot 1 having 32 bits. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 5 to 11) is unused/reserved. Field 1507 (bits 0 to 5) are coded a set of unique bits (CCEX1) to identify the condition code extension slot 1.

Once this unique ID of condition code extension slot 1 is detected, the corresponding creg/z bits are employed to control conditional execution of any M1 unit 223, M2 unit 243, C unit 245, N1 unit 224 and N2 unit 244 instruction in the same execution packet. These creg/z bits are interpreted as shown in Table 1. If the corresponding instruction is conditional (includes creg/z bits) the corresponding bits in the condition code extension slot 1 override the condition code bits in the instruction. Note that no execution packet can have more than one instruction directed to a particular execution unit. No execute packet of instructions can contain more than one condition code extension slot 1. Thus the mapping of creg/z bits to functional unit instruction is unambiguous. Setting the creg/z bits equal to "0000" makes the instruction unconditional. Thus a properly coded condition code extension slot 1 can make some instructions conditional and some unconditional.

It is feasible for both condition code extension slot 0 and condition code extension slot 1 to include a p bit to define an execute packet as described above in conjunction with FIG. 13. In the preferred embodiment, as illustrated in FIGS. 14 and 15, code extension slot 0 and condition code extension slot 1 preferably have bit 0 (p bit) always encoded as 1. Thus neither condition code extension slot 0 nor condition code extension slot 1 can be in the last instruction slot of an execute packet.

The preferred embodiment includes two different constant extension slots. Each execute packet can contain one each of these unique 32-bit constant extension slots which contains 27 bits to be concatenated as high order bits with the 5-bit constant field 1304 to form a 32-bit constant. As noted in the instruction coding description above only some instructions define the src2/cst field 1304 as a constant rather than a source register identifier. At least some of those instructions may employ a constant extension slot to extend this constant to 32 bits (described below).

Figure 16:
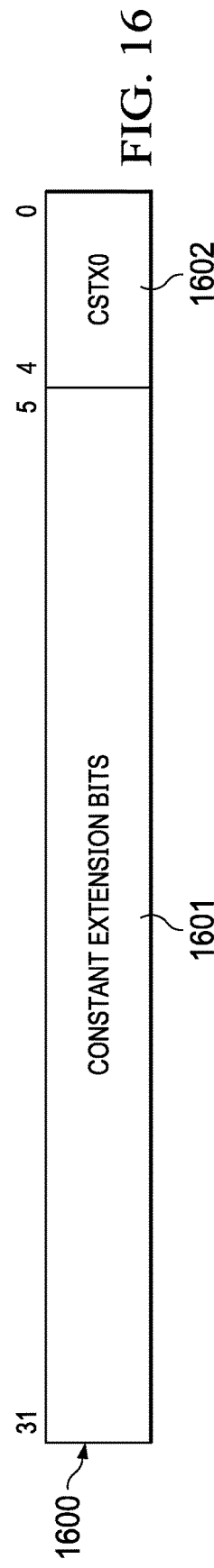
FIG. 16 illustrates the bit coding of a constant extension slot 0.

FIG. 16 illustrates the fields of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant including the target instruction field 1304 as the five least significant bits. Field 1602 (bits 0 to 4) are coded a set of unique bits (CSTX0) to identify the constant extension slot 0. In the preferred embodiment constant extension slot 0 1600 can only be used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. In the preferred embodiment constant extension slot 1 can only be used to extend the constant of one of an L2 unit 241 instruction, data in a D2 unit 226 instruction, an S1 unit 222 instruction, an offset in a D1 unit 225 instruction, an M1 unit 223 instruction or an N1 unit 224 instruction in the same execute packet.

Constant extension slot 0 and constant extension slot 1 are used as follows. The target instruction must be of the type permitting constant specification. As known in the art this is implemented by replacing one input operand register specification field with the least significant bits of the constant. Instruction decoder 113 determines this case known as an immediate field from the instruction opcode bits. The target instruction also includes bit coding signaling whether the specified constant is not extended. This is preferably constant extension bit 1307 with constant extension bit=0 indicating constant extension disabled and constant extension bit=1 indicating constant extension enabled. If instruction decoder 113 detects constant extension slot 0 or constant extension slot 1, it further checks the other instructions within that execute packet for an instruction corresponding to the detected constant extension slot. Preferably constant extension is made only if one corresponding instruction has a constant extension bit 1307 equal to 1.

Figure 17:
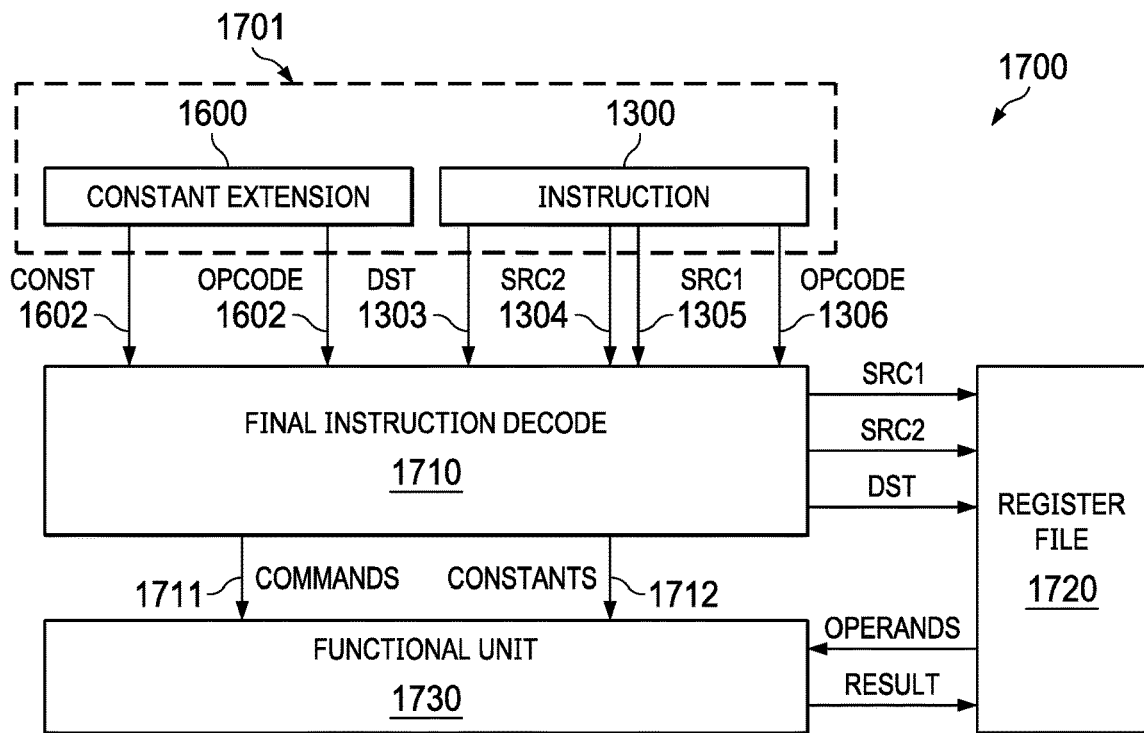
FIG. 17 is a partial block diagram illustrating specification or extension of constant bits in accordance with this invention.

FIG. 17 is a partial block diagram 1700 illustrating this embodiment of constant specification or extension. FIG. 17 assumes that instruction decoder 113 detects a constant extension slot and a corresponding instruction in the same execute packet. FIG. 17 illustrates execute packet 1701 including an instruction 1300 (coded as illustrated in FIG. 13) and constant extension instruction 1600 (coded as illustrated in FIG. 16). Other instructions in execute packet 1701 are not relevant to this description and illustrated in dashed lines. Final instruction decode 1710 is a part of instruction decoder 113 illustrated in FIG. 1 devoted to final instruction decode for functional unit 1730. Functional unit 1730 could be any of the scalar datapath side A 115 functional units including L1 unit 221, S1 unit 222, M1 unit 223, N1 unit 224, D1 unit 225 and D2 unit 226 or vector datapath side B 115 functional units including L2 unit 241, S2 unit 242, M2 unit 243, N2 unit 244, C unit 245 and P unit 246. Final instruction decode 1710 receives constant extension bits 1601 and unique bits 1602 identifying the constant extension slot 1600. Final instruction decode 1710 receives destination field (dst) 1303, second input operand field (src2) 1304, first input operand field (src1) 1305 and opcode field 1306 from instruction 1300. Other parts of instruction decoder 113 (not illustrated in FIG. 17) identify and forward these fields to final instruction decode 1710. Final instruction decode 1710 parses these fields and generates outputs for register file 1720 and functional unit 1730.

Register file 1720 represents the registers accessible to functional unit 1730. As illustrated in FIG. 2, each functional unit 1730 may access a corresponding global register file and a corresponding local register file. The default meaning of destination field 1303, second input operand field 1304 and first input operand field 1305 are register numbers within the corresponding accessible registers. As known in the art, coding of these fields points to a unique register where data is stored. According to the default meaning, second input operand field 1304 and first input operand field 1305 identify registers storing input operands for functional unit 1730. Under the proper circumstances (determined by the particular meaning of opcode 1306 of this instruction), final instruction decode 1710 supplies corresponding register numbers to register file 1720. Register file 1720 recalls the data stored in the identified registers and supplies input operands to functional unit 1730. Final instruction decode 1710 also supplies the register number corresponding to the destination field 1303 to register file 1720. Register file 1720 stores a result produced by functional unit 1730 into the register identified by the destination field 1303.

Final instruction decode 1710 supplies commands 1711 to functional unit 1730. Commands 1711 correspond to the data processing operation defined by opcode 1306 of instruction 1300. Final instruction decode 1710 parses opcode 1306 and supplies corresponding commands 1711 to functional unit 1730 controlling functional unit 1730 to perform the identified data processing operation. Functional unit 1730 performs the commanded data processing operation, supplying the result to register file 1720.

Final instruction decode 1710 also supplies constants 1712 to functional unit 1730. Functional unit 1730 may receive data for its operations from two sources. This data may be stored in register file 1720 as identified by second input operand field 1304 and first input operand field 1305. This data may be specified as a constant by the instruction. It is known in the art that one of both input operand fields 1304 and 1305 may be parsed not as a register number but as a constant operand. This is known in the art as immediate operation. In immediate operation, functional unit 1730 employs the operand field as an input operand directly rather than data recalled from register file 1720. Because the typical input operand field such as 1304 and 1305 have fewer bits than can be stored in register file 1720, such immediate operation limits the size and range of constants that can be specified. This invention enables another instruction in the same execute packet to specify or extend the constants of an instruction. This permits specification of additional constant bits than possible in the known art. According to this invention constant extension bits 1601 may specify one of more constants or be used to extend the bits of constants based upon one or more input operand fields.

Figure 18:
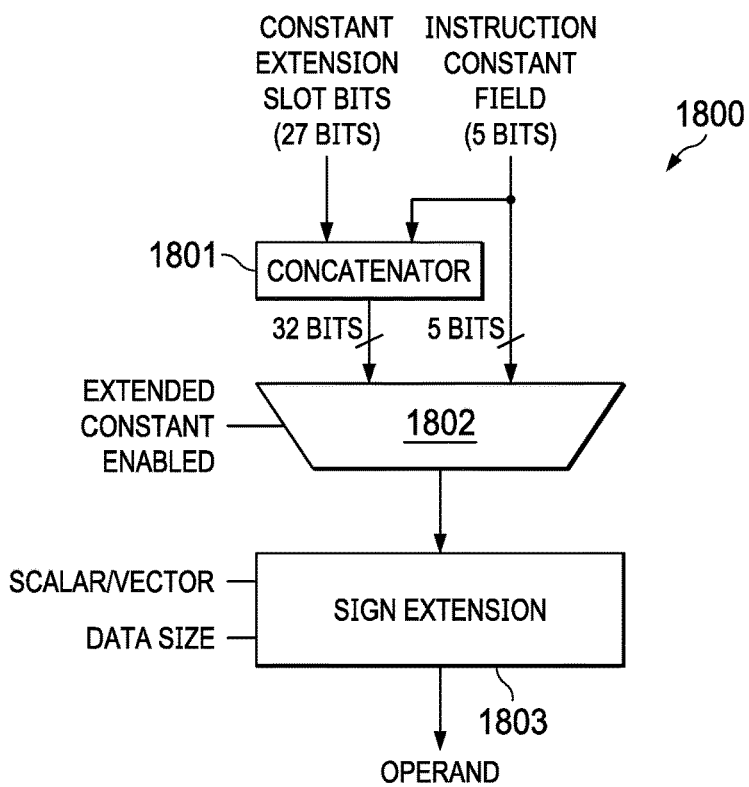
FIG. 18 is a partial block diagram illustrating a first embodiment of constant extension forming one extended constant.
Figure 19:
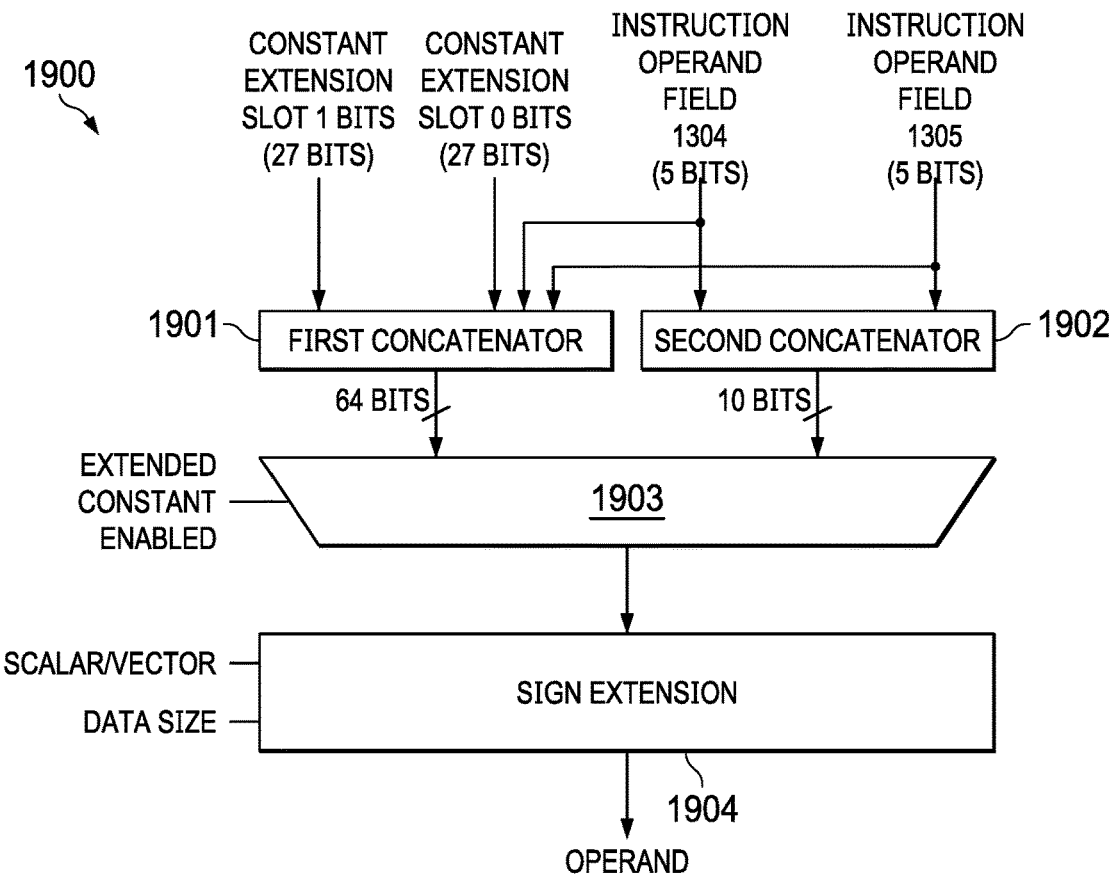
FIG. 19 is a partial block diagram illustrating a second embodiment of constant extension forming one larger extended constant.
Figure 20:
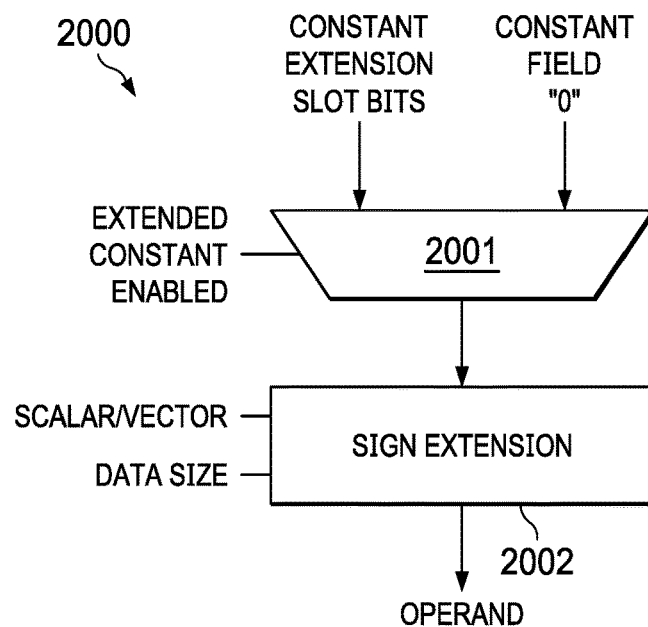
FIG. 20 is a partial block diagram illustrating a third embodiment of constant extension with the constant extension slot specifying one constant.
Figure 21:
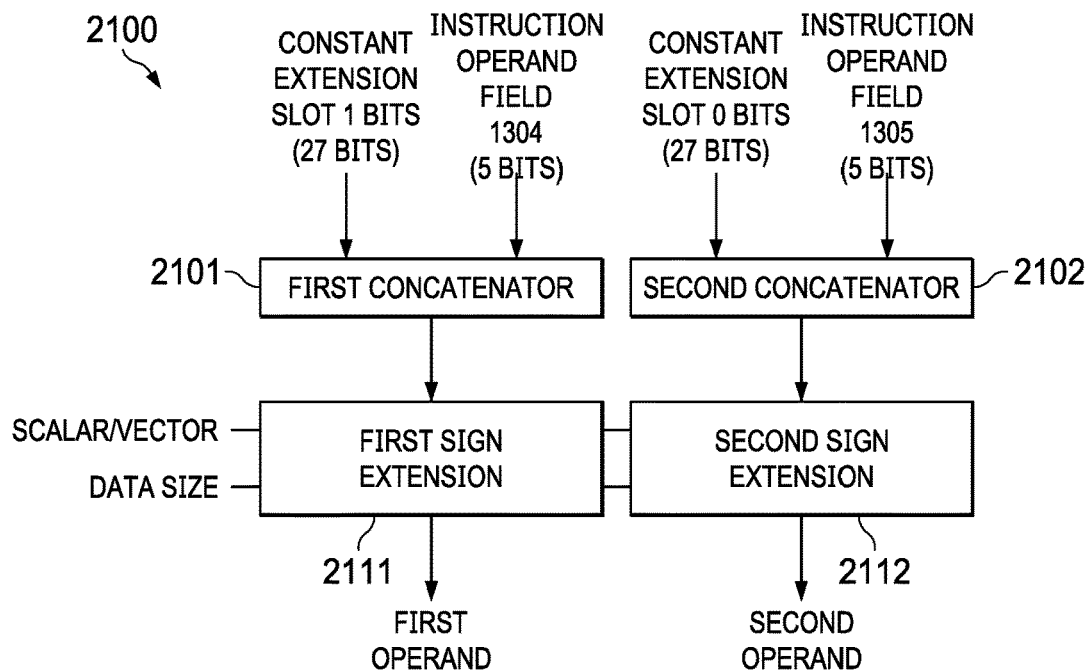
FIG. 21 illustrates forming two extended constants employing two constant extension slots.
Figure 22:
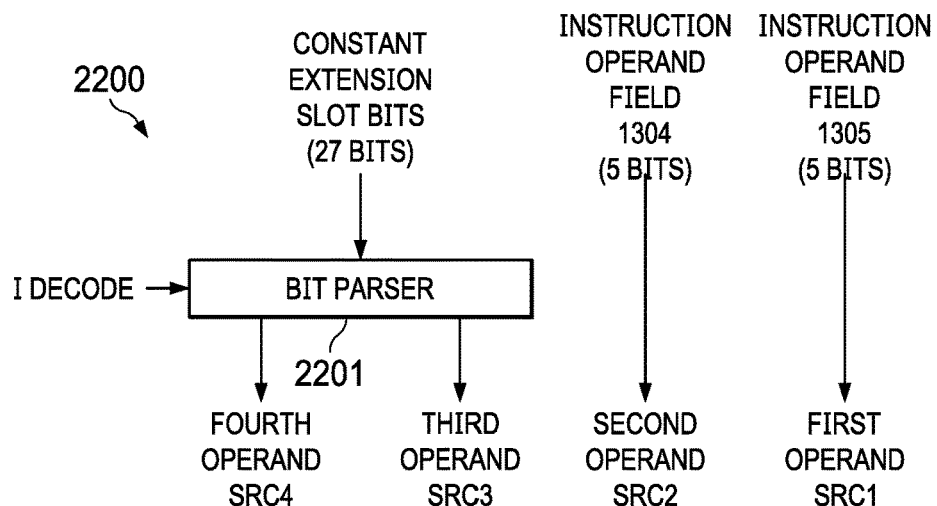
FIG. 22 illustrates forming two constants from the constant extension bits of a single constant extension instruction.

FIGS. 18 to 22 illustrate examples of constant operation of this invention. FIG. 18 illustrates forming a 32 bit constant from src2/cst field 1303 and constant extension bits 1601 of a constant extension instruction. FIG. 19 illustrates forming a 64 bit constant from src1 field 1304, src2/cst field 1303, constant extension bits 1601 of a constant extension instruction 0 and constant extension bits 1601 of a constant extension instruction 1. FIG. 20 illustrates forming a constant using only the constant extension bits 1601 of a constant extension instruction. FIG. 21 illustrates forming two constants, the first from src2/cst field 1304 and constant extension bits 1601 of a constant extension instruction 1, the second constant from constant from src1 field 1304 and constant extension bits 1601 of a constant extension instruction 0. FIG. 22 illustrates forming two constants from constant extension bits 1601 of a constant extension instruction.

FIG. 18 illustrates a preferred embodiment of constant extension of this invention. FIG. 18 assumes that instruction decoder 113 detects a constant extension slot and a corresponding instruction in the same execute packet. In FIG. 18 instruction decoder 113 supplies the 27 extension bits from the constant extension slot (bit field 1601) and the 5 constant bits (bit field 1304) from the corresponding instruction to concatenator 1801. Concatenator 1801 forms a single 32-bit word from these two parts. In the preferred embodiment field 1601 of the constant extension slot constitute the most significant 27 bits and field 1304 of the target instruction constitute the five least significant bits. This combined 32-bit word is supplied to one input of multiplexer 1802. The 5 constant bits from the corresponding instruction field 1304 supply a second input to multiplexer 1802. Selection of multiplexer 1802 is controlled by whether extended constant formation is enabled. In the preferred embodiment this is indicated by the status of the e bit 1307. If the e bit is 1 (extended), multiplexer 1802 selects the concatenated 32-bit input from concatenator 1801. If the e bit is 0 (not extended), multiplexer 1802 selects the 5 constant bits from the corresponding instruction field 1304. Multiplexer 1802 supplies this output to an input of sign extension unit 1803.

Sign extension unit 1803 forms the final operand value from the input from multiplexer 1803. Sign extension unit 1803 receives control inputs Scalar/Vector and Data Size. The Scalar/Vector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) can only perform scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode 1306. P unit 246 may only preform scalar instructions. The Data Size may be 8 bits (byte B), 16 bits (half-word H), 32 bits (word W) or 64 bits (double word D).

Table 2 lists the operation of sign extension unit 1803 for the various options in the preferred embodiment.

TABLE 2

| Instruction Type | Operand Size | Constant Length | Action |
| --- | --- | --- | --- |
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

In an alternative embodiment, the constant is extended based upon data in more than one constant extension slot. FIG. 19 is a partial block diagram 1900 illustrating this embodiment of constant extension. FIG. 19 assumes that instruction decoder 113 detects a constant extension slot 0, a constant extension slot 1 and a corresponding instruction in the same execute packet. Instruction decoder 113 supplies the 27 extension bits from the constant extension slot 1 (bit field 1601), the 27 extension bits from the constant extension slot 0 (bit field 1601), the 5 constant bits (bit field 1304) and the 5 bits from bit field 1305 from the corresponding instruction to first concatenator 1901. First concatenator 1901 forms a single 64-bit word from these four parts. In the preferred embodiment the field 1601 from constant extension slot 1 is the most significant bits, the field 1601 from constant extension slot 0 is the next least significant bits, the field 1304 as the next least significant bits and the field 1305 as the least significant bits. This combined 64-bit word is supplied to one input of multiplexer 1903. Instruction decoder 113 supplies the 5 constant bits (bit field 1304) and the 5 bits from bit field 1305 from the corresponding instruction to second concatenator 1902. Second concatenator 1902 forms a single 10-bit word from these two parts. In the preferred embodiment the field 1304 is the most significant bits and the field 1305 is the least significant bits. This combined 10-bit word is supplied to a second input of multiplexer 1903. The selection of multiplexer 1802 is controlled by whether extended constant formation is enabled. In the preferred embodiment this is indicated by the status of the constant extension bit (e bit). If the constant extension bit is 1 (extended), multiplexer 1903 selects the concatenated 64-bit input from first concatenator 1901. If the constant extension bit is 0 (not extended), multiplexer 1903 selects the concatenated 10-bit input from concatenator 1902. Multiplexer 1903 supplies this output to an input of sign extension unit 1904. Sign extension unit 1904 operates as sign extension unit 1803 previously described.

FIG. 20 illustrates a yet further embodiment of this invention. Partial block diagram 2000 selects a constant specified wholly from the constant extension slot or a constant of "0". FIG. 20 assumes that instruction decoder 113 detects a constant extension slot and a corresponding instruction in the same execute packet. Instruction decoder 113 supplies the 27 extension bits from the constant extension slot (bit field 1601) to one input of multiplexer 2001. The other input of multiplexer 2001 receives a constant of "0". The selection of multiplexer 2002 is controlled by whether extended constant formation is enabled. In the preferred embodiment this is indicated by the status of the constant extension bit (e bit). If the constant extension bit is 1 (extended), multiplexer 2002 selects the bits from bit field 1601 of the constant extension slot. If the constant extension bit is 0 (not extended), multiplexer 2001 selects the constant "0". Multiplexer 2001 supplies this output to an input of sign extension unit 2002. Sign extension unit 2002 operates as sign extension unit 1803 previously described.

FIG. 21 illustrates another alternative for constant formation according to this invention. Partial block diagram 2100 forms two constants. FIG. 21 assumes that instruction decoder 113 detects a constant extension slot 0, a constant extension slot 1 and a corresponding instruction in the same execute packet. Instruction decoder 113 supplies the 27 extension bits from the constant extension slot 1 (bit field 1601) and the 5 constant bits (bit field 1304) to first concatenator 2101. First concatenator 2101 forms a single 32-bit word from these two parts. In the preferred embodiment the field 1601 from constant extension slot 1 is the most significant bits and src2/cst field 1304 are the least significant bits. The output of first concatenator 2101 supplies first sign extension 2111 which operates as sign extension unit 1803 producing a first constant operand.

Instruction decoder 113 supplies the 27 extension bits from the constant extension slot 0 (bit field 1601) and the 5 bits from bit field 1305 from the corresponding instruction to second concatenator 2102. Second concatenator 2102 forms a single 32-bit word from these two parts. In the preferred embodiment the field 1601 from constant extension slot 0 is the most significant bits and the field 1305 is the least significant bits. The output of second concatenator 2102 supplies second sign extension 2112 which operates as sign extension unit 1803 producing a first constant operand.

FIG. 22 illustrates forming two constants from constant extension bits 1601 of a constant extension instruction. Partial block diagram 2200 forms two constants from constant extension bits. FIG. 22 assumes that instruction decoder 113 detects a constant extension slot and a corresponding instruction in the same execute packet. Instruction decoder 113 supplies the 27 extension bits from Partial block diagram 2100 forms two constants. Instruction decoder 113 supplies the 27 extension bits from the constant extension slot 1 (bit field 1601) to bit parser 2201. Bit parser 2201 is controlled by instruction decoder 113 to parse this bit field into two constants named third operand src3 and fourth operand src4. In a preferred embodiment each of these are 5 bits fields used as additional register numbers to access register file 1720 to support a four operand instruction. The nature of the instruction as indicated by opcode 1306 determines the mapping of bit field 1601 bits to the two constants. Each resulting constant could be a (possibly overlapping) subset of bit field 1601. Not at bits of bit field 1601 need to appear in one of the constants. Bit parser 2201 discards unused bits of bit field 1601.

It is feasible for both constant extension slot 0 and constant extension slot 1 to include a p bit to define an execute packet as described above in conjunction with FIG. 13. In the preferred embodiment, as in the case of the condition code extension slots, constant extension slot 0 and constant extension slot 1 preferably have bit 0 (p bit) always encoded as 1. Thus neither constant extension slot 0 nor constant extension slot 1 can be in the last instruction slot of an execute packet.

It is technically feasible for an execute packet to include a constant extension slot 0 or 1 and more than one corresponding instruction marked constant extended (e bit=1). For constant extension slot 0 this would mean more than one of an L1 unit 221 instruction, data in a D1 unit 225 instruction, an S2 unit 242 instruction, an offset in a D2 unit 226 instruction, an M2 unit 243 instruction or an N2 unit 244 instruction in an execute packet have a constant extension bit of 1. For constant extension slot 1 this would mean more than one of an L2 unit 241 instruction, data in a D2 unit 226 instruction, an S1 unit 222 instruction, an offset in a D1 unit 225 instruction, an M1 unit 223 instruction or an N1 unit 224 instruction in an execute packet have a constant extension bit of 1. Supplying the same constant extension to more than one instruction is not expected to be a useful function. Accordingly, in one embodiment instruction decoder 113 may determine this case an invalid operation and not supported. Alternately, this combination may be supported with the same extension bits of the constant extension slot applied to each corresponding functional unit instruction identified constant extended.

Special vector predicate instructions use registers in predicate register file 234 to control vector operations. In the current embodiment all these SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 245 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 23:
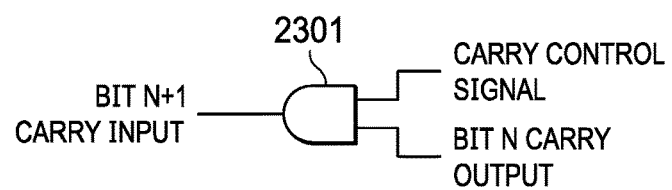
FIG. 23 illustrates the carry control for SIMD operations according to this invention.

FIG. 23 illustrates the carry control. AND gate 2301 receives the carry output of bit N within the operand wide arithmetic logic unit (64 bits for scalar datapath side A 115 functional units and 512 bits for vector datapath side B 116 functional units). AND gate 2301 also receives a carry control signal which will be further explained below. The output of AND gate 2301 is supplied to the carry input of bit N+1 of the operand wide arithmetic logic unit. AND gates such as AND gate 2301 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512 bit wide operand such as used by vector datapath side B 116 functional units which may be divided into sections of 8 bits, 16 bits, 32 bits, 64 bits, 128 bits or 256 bits. In Table 3 the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals | | | | | | | |
|---|---|---|---|---|---|---|---|---|
| 8 bits (B) | -000 0111 | 0000 1111 | 0000 0111 | 0000 1111 | 0000 0111 | 0000 1111 | 0000 0111 | 0000 1111 |
| 16 bits (H) | -101 0101 | 0101 0101 | 0101 0101 | 0101 0101 | 0101 0101 | 0101 0101 | 0101 0101 | 0101 0101 |
| 32 bits (W) | -111 0111 | 0111 0111 | 0111 0111 | 0111 0111 | 0111 0111 | 0111 0111 | 0111 0111 | 0111 0111 |
| 64 bits (D) | -111 0111 | 1111 1111 | 0111 0111 | 1111 1111 | 0111 0111 | 1111 1111 | 0111 0111 | 1111 1111 |
| 128 bits | -111 0111 | 1111 1111 | 1111 1111 | 1111 1111 | 0111 0111 | 1111 1111 | 1111 1111 | 1111 1111 |
| 256 bits | -111 0111 | 1111 1111 | 1111 1111 | 1111 1111 | 1111 1111 | 1111 1111 | 1111 1111 | 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

What is claimed is:

1. A method comprising:
receiving an execute packet of instructions that includes:
a first instruction that includes an opcode field that designates an operation and a constant extension bit field that is distinct from the opcode field; and
a second instruction that includes a first field;
determining whether the constant extension bit field in the first instruction indicates a value that is either a first value or a second value;
selecting one of a third value and a fourth value for forming a constant by:
when the constant extension bit field in the first instruction indicates the first value: selecting the third value for forming the constant, the third value being equal to a 0 value, and excluding the fourth value from forming the constant; and
when the constant extension bit field in the first instruction indicates the second value: selecting the fourth value for forming the constant, the fourth value being equal to a value indicated by bits stored in a first field of the second instruction, and excluding the third value from forming the constant;
forming the constant based on the selected one of the third and fourth values; and
providing the constant for performing the operation designated by the opcode field of the first instruction.

2. The method of claim 1, wherein the constant extension bit field in the first instruction consists of a single bit.

3. The method of claim 2, wherein the first value is a logic 0 and the second value is a logic 1.

4. The method of claim 3, further comprising:
supplying the third value to a first input of a multiplexer;
supplying the fourth value to a second input of the multiplexer;
supplying the value indicated by the constant extension bit field in the first instruction to a control input of the multiplexer; and
outputting an output value at an output of the multiplexer, wherein the output value is the selected one of the third value and the fourth value depending on the control input.

5. The method of claim 4, further comprising:
determining whether the first instruction is a scalar instruction or a vector instruction; and
sign extending the output value based on whether the first instruction is a scalar instruction or a vector instruction, wherein the providing of the constant provides the sign extended output value.

6. The method of claim 5, wherein the first instruction and the second instruction are 32-bit instructions, and wherein sign extending the output value based whether the first instruction is a scalar instruction or a vector instruction comprises:
when the first instruction is a scalar instruction, sign extending the output value to 64 bits; and
when the first instruction is a vector instruction, sign extending the output value to an indicated operand size and replicating the sign extended output value across 512 bits.

7. The method of claim 1, further comprising:
determining whether the first instruction is a scalar instruction or a vector instruction; and
sign extending the selected one of the third and fourth values based on whether the first instruction is a scalar instruction or a vector instruction, wherein the providing of the constant provides the selected one of the third and fourth values having sign extension performed thereupon.

8. The method of claim 7, wherein the first instruction and the second instruction are 32-bit instructions, and wherein sign extending the selected one of the first and second values based whether the first instruction is a scalar instruction or a vector instruction comprises:
when the first instruction is a scalar instruction, sign extending the selected one of the first and second values to 64 bits; and
when the first instruction is a vector instruction, sign extending the selected one of the first and second values to an indicated operand size and replicating the sign extended output value across 512 bits.

9. The method of claim 8, wherein the operand size is selected as one of a byte, a half-word, a word, and a double-word.

10. The method of claim 1, wherein the second instruction further includes a second field containing a set of unique bits to identify the second instruction as a constant extension slot instruction.

11. The method of claim 10, wherein each instruction in the execute packet is 32 bits and wherein:
the first field of the second instruction is 27 bits; and
the second field of the second instruction is 5 bits.

12. A method comprising:
receiving an execute packet of instructions that includes:
   a first instruction that includes an opcode field that designates an operation and a constant extension bit that is distinct from the opcode field; and
   a constant extension instruction that includes a first field;
determining whether the constant extension bit in the first instruction represents a first value indicating that first and second constants are to be formed; and
based on the constant extension bit in the first instruction representing the first value:
   parsing at least a portion of a plurality of bits stored in a first field of the constant extension instruction to form the first constant and the second constant;
   providing the first constant as a first operand for executing the operation; and
   providing the second constant as a second operand for executing the operation.

13. The method of claim 12, wherein, when the constant extension bit in the first instruction stores the first value, no constants in any field of the first instruction are extended using any of the bits stored in the first field of the constant extension instruction.

14. The method of claim 12, wherein the first instruction further includes a first field storing a third operand for executing the operation, the third operand being separate from the first and second operands.

15. The method of claim 14, wherein the first instruction additionally includes a second field storing a fourth operand for executing the operation, the fourth operand being separate from the first, second, and third operands.

16. The method of claim 12, wherein parsing at least a portion of a plurality of bits stored in the first field of the constant extension instruction includes parsing all of the bits in the first field of the constant extension instruction.

17. The method of claim 12, wherein parsing at least a portion of a plurality of bits stored in the first field of the constant extension instruction includes parsing less than all of the bits in the first field of the constant extension instruction, and wherein bits that were not parsed into the first and second constants are discarded.

18. The method of claim 12, wherein the constant extension instruction includes a second field separate from the first field of the constant extension instruction, the second field of the constant extension instruction containing a set of unique bits to identify the constant extension instruction.

19. The method of claim 18, wherein the first and second fields of the constant extension instruction are the only fields of the constant extension instruction.

20. A data processing apparatus comprising:
a plurality of functional units each operable to perform instruction-specified data processing operations on instruction-specified data;
at least one data register file connected to each functional unit, each data register file including data registers to store data, and each data register identified by a corresponding register number;
an instruction fetch unit to fetch instructions from a memory;
an instruction dispatch unit to determine an execute packet of instructions to simultaneously dispatch to a first functional unit of the functional units, the execute packet including:
   a first instruction that includes an opcode field that designates an operation and a constant extension bit distinct from the opcode field; and
   a second instruction that includes a first field and that is a constant extension instruction; and
an instruction decode unit to decode the first instruction by:
   determining whether the constant extension bit in the first instruction contains a first value indicating that first and second constants are to be formed from the constant extension instruction for execution of the operation; and
   when the constant extension bit in the first instruction contains the first value:
      parsing at least a portion of a plurality of bits stored in the first field of the constant extension instruction to form the first constant and the second constant;
      providing the first constant as a first operand for execution of the operation by the first functional unit; and
      providing the second constant as a second operand for execution of the operation by the first functional unit.

21. The data processing apparatus of claim 20, wherein, when the constant extension bit in the first instruction stores the first value, no constants in any field of the first instruction are extended using any of the bits stored in the first field of the constant extension instruction.

22. The data processing apparatus claim 20, wherein the first instruction further includes a first field storing a third operand for execution of the operation by the first functional unit, the third operand being separate from the first and second operands.

23. The data processing apparatus claim 22, wherein the first instruction additionally includes a second field storing a fourth operand for execution of the operation by the first functional unit, the fourth operand being separate from the first, second, and third operands.

24. The data processing apparatus claim 20, wherein parsing at least a portion of a plurality of bits stored in the first field of the constant extension instruction includes parsing all of the bits in the first field of the constant extension instruction.

25. The data processing apparatus claim 20, wherein parsing at least a portion of a plurality of bits stored in the first field of the constant extension instruction includes parsing less than all of the bits in the first field of the constant extension instruction, and wherein the instruction decode unit discards the bits in the first field of the constant extension instruction that were not parsed into the first and second constants.

26. The data processing apparatus claim 20, wherein the constant extension instruction further includes a second field separate from the first field of the constant extension instruction, the second field of the constant extension instruction containing a set of unique bits to enable the instruction decode unit to identify the constant extension instruction.

27. The data processing apparatus of claim 26, wherein the first and second fields of the constant extension instruction are the only fields of the constant extension instruction.

28. The data processing apparatus of claim 20, wherein the data processing apparatus includes a digital signal processor.

* * * * *